US010248508B1

(12) United States Patent
Park et al.

(10) Patent No.: US 10,248,508 B1
(45) Date of Patent: Apr. 2, 2019

(54) DISTRIBUTED DATA VALIDATION SERVICE

(71) Applicant: Amazon Technologies, Inc., Reno, NV (US)

(72) Inventors: Yangbae Park, Seattle, WA (US); Jason Scott Flittner, Seattle, WA (US); Aaron John Seldon Steers, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 235 days.

(21) Appl. No.: 14/310,429

(22) Filed: Jun. 20, 2014

(51) Int. Cl.
*G06F 17/30* (2006.01)
*G06F 11/14* (2006.01)
*G06F 11/36* (2006.01)
*H04L 12/24* (2006.01)

(52) U.S. Cl.
CPC ...... *G06F 11/1412* (2013.01); *G06F 11/1402* (2013.01); *G06F 11/3688* (2013.01); *G06F 17/30595* (2013.01); *H04L 41/0631* (2013.01)

(58) Field of Classification Search
CPC .............. G06F 17/30; G06F 17/30592; G06F 11/3688; G06F 17/30595; H04L 41/0631; H04L 41/16
USPC ......................................... 707/607, 690, 694
See application file for complete search history.

(56) References Cited

U.S. PATENT DOCUMENTS

| | | | |
|---|---|---|---|
| 5,661,668 A * | 8/1997 | Yemini | G06F 11/2257 702/186 |
| 6,996,551 B2 * | 2/2006 | Hellerstein | G06K 9/62 707/999.006 |
| 7,490,319 B2 | 2/2009 | Blackwell et al. | |
| 7,885,929 B2 | 2/2011 | Moore, Jr. et al. | |
| 8,019,795 B2 | 9/2011 | Anderson et al. | |
| 8,219,520 B2 | 7/2012 | Li et al. | |
| 8,311,975 B1 | 11/2012 | Gonsalves | |
| 8,689,175 B2 | 4/2014 | Matsumoto | |
| 2002/0073195 A1 * | 6/2002 | Hellerstein | H04L 41/0631 709/224 |
| 2003/0074439 A1 * | 4/2003 | Grabarnik | H04L 41/024 706/909 |
| 2003/0078686 A1 * | 4/2003 | Ma | G06F 7/02 707/E17.091 |
| 2004/0006403 A1 * | 1/2004 | Bognanno | G06Q 10/06 700/109 |
| 2006/0075189 A1 * | 4/2006 | Hood | G06F 3/0614 711/114 |
| 2006/0178917 A1 * | 8/2006 | Merriam | G06Q 10/06312 705/7.22 |
| 2007/0038683 A1 | 2/2007 | Dixon et al. | |

(Continued)

*Primary Examiner* — Vincent F Boccio
(74) *Attorney, Agent, or Firm* — Robert C. Kowert; Meyertons, Hood, Kivlin, Kowert & Goetzel, P.C.

(57) ABSTRACT

A data validation service may validate data sets maintained for one or more data sources. Several rule sets may describe various rules used to validate one or more data sets. The rule sets may be automatically applied to respective data sets in order to validate the respective data sets according to a dynamically determined schedule for the application of the rule sets. Reporting events may be detected which correspond to a rule set. In response to detecting a reporting event, a responsive action may be performed as described in the rule set, such as providing notification of the reporting event.

20 Claims, 10 Drawing Sheets

(56) References Cited

U.S. PATENT DOCUMENTS

| | | | |
|---|---|---|---|
| 2007/0288933 A1* | 12/2007 | Shariff | G06Q 30/02 |
| | | | 719/318 |
| 2009/0287617 A1 | 11/2009 | Schmidt | |
| 2010/0161281 A1* | 6/2010 | Brown | G06F 11/3664 |
| | | | 702/186 |
| 2012/0054295 A1* | 3/2012 | Cai | H04L 67/2852 |
| | | | 709/213 |
| 2014/0081931 A1 | 3/2014 | Kung et al. | |

* cited by examiner

DISTRIBUTED DATA VALIDATION SERVICE

BACKGROUND

In order to gain greater insight from data analysis, more operations, businesses and services are collecting business metrics and other data to provide a clearer picture of what is happening day-to-day, month-to-month, year-over-year or across any other period of time. Revenue analysis, marketing studies, and resource forecasting are some of the many different types of applications for which collected data may be useful. However, as the amount of data collected grows, it becomes increasingly difficult to validate whether the reported content is correct. Errors may infiltrate large data sets and escape detection as manual validation becomes ineffective for ensuring that collected data is correct, and therefore useful. Moreover, as the sources of collected data may grow in number and diversity, it may be difficult even for automated validation techniques to cope with the complex validation scenarios that occur validating large and diverse data sets require.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may implement a distributed data validation service, according to some embodiments. Large numbers or collections of data set(s) (sometimes referred to as Big Data) are common now that many different entities, business, organization, and services collect data for many different types of monitoring, reporting, analysis and forecasting. As noted above, errors may be introduced into the data which may reduce the efficacy of the monitoring, reporting, analysis and forecasting performed based on erroneous data. The greater the amount of data, the greater the amount of time may be required to check for these errors in the data (and the lesser likelihood that the errors will be discovered). Additionally, many different views of the data may be generated or created for reporting, further obfuscating errors that may be included in particular data.

Figure 1:
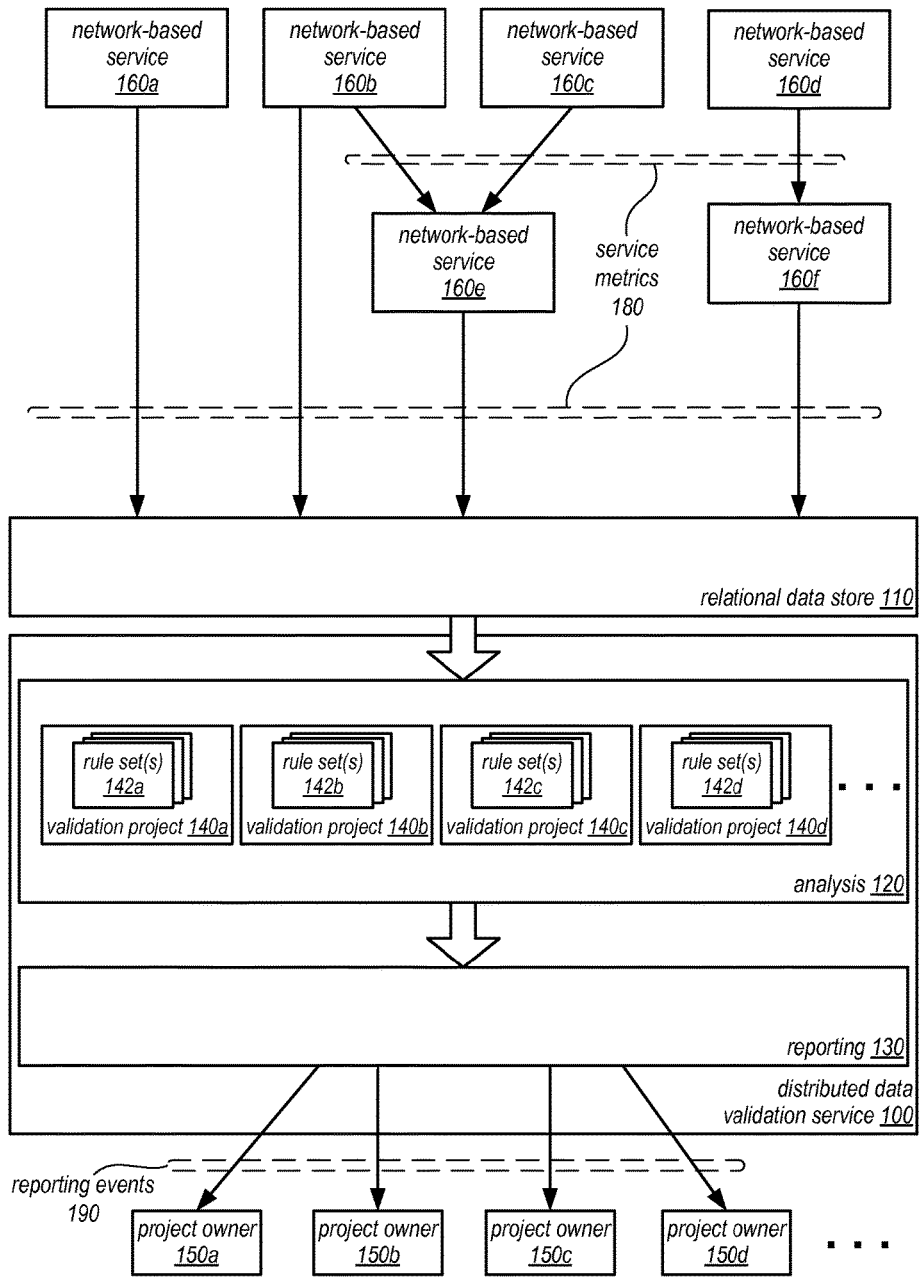
FIG. 1 is a diagram illustrating a distributed data validation service, according to some embodiments.

FIG. 1 is a diagram illustrating a distributed data validation service, according to some embodiments. Distributed data validation service 100 may be configured to validate data received from various sources, such as different network-based services 160 reporting service metrics 180, in order to identify errors or other problematic behavior (e.g., fraud) that may be determined based on the service metrics 180. Different errors, omissions, or other erroneous changes may be made to data either on route to storage, or during processing at various components that may handle the data. The data itself may be retrieved form a data store, such as relational data store 110, for analysis at the distributed data validation service, various different validation tests or techniques may be applied as may be described in different rule sets or projects. Detected errors or conditions relating to data (some of which may be positive, such as a spike in sales) may trigger reporting events that may be sent to the various stakeholders or project owners 150 that are responsible for the particular validation.

As illustrated in FIG. 1, multiple network-based services, such as network-based services 160a, 160b, 160c, 160d, 160e and 160f may generate various service metrics 180 as part of the performance of the respective service. Service metrics 180 may, in various embodiments, be business metrics, usage information, current state of resources or the service itself, performance characteristics, billing or other transaction information, or more generally any type of data useful for subsequent analysis (which are referred to herein as business or service metrics). In various embodiments, these service metrics 180 may be sent to relational data store 110 to be persistently stored as part of respective data sets. In some embodiments, data sets may store data for a specified period of time, after which it may be overwritten. For some data sets, however, new data sets may be maintained instead of overwriting older data sets. Data sets may be maintained in persistent storage until such a time as subsequent analysis, aggregation, or reporting may be performed.

Different errors, corruptions, losses, or other erroneous modifications may occur to service metrics 180 before, during, or after storage in relational data store 110, in at least some embodiments. Errors may include, but are not limited to, missing data duplicate data, performance between systems syncing data, errors in the content of the data (e.g., wrong information in data fields). For example, a reporting mechanism at service 160*a* may leave out sending a portion of a data set (e.g., 1 hour of data out of a data set of 24 hours of data). Typically, the greater number of systems, services or processes handling service metrics 180, the greater likelihood that some kind of error is introduced into service metrics 180 upstream. As noted above, other data related conditions or changes may also be worthy of attention, triggering reporting events.

While some network-based services may directly report or stream their respective service metrics into relational data store 110, such as network-based service 160*a* and network-based service 160*b*, in some embodiments one or more multiple other network-based services, systems, or components, may process, handle, or otherwise interact with, increasing the number of points at which error may be introduced. Services 160*b* and 160*c* stream service metrics 180 to service 160*e*, which then forwards the service metrics 180 on (often after transforming or generating further service metrics 180 based on them in some way) to relational data 110. For example, network-based service 160*d* may be a data storage service. Service metrics 180 may be sent from the data storage service (160*d*) to network-based service 160*f*, which may be some kind of billing or metering service. The billing or metering service (160*0* may then add its own generated service metrics 180 to the data streamed to relational data store 110 for storage.

In various embodiments, distributed data validation service 100 may implement analysis module 120 to determine when, where, and how to validate different data sets maintained in relational data store 110. For example, analysis module 110 may, in some embodiments be configured to validate the integrity of data in the data set (e.g., checking for various conditions of the data set), compare the data contained within two different tables, views, or queries of a data set, over evaluate the changes to data associated over time. In at least some embodiments, analysis module may enforce multiple validation projects, such as validation projects 140*a*, 140*b*, 140*c* and 140*d*. These validation projects may include respective rule set(s), such as rule set(s) 142*a*, 142*b*, 142*c* and 142*d* respectively. Rule set(s) 142 may define particular validations to be performed with respect to one or multiple data sets, in some embodiments. Rule set(s) 142 may defined according to human-readable or well-known data manipulation techniques, such as defining a set of Structured Query Language (SQL) statements and respective responsive actions in a JavaScript Object Notation (JSON) document or some other form of declarative human-readable markup language. Project owners 150 may be the respective stakeholders, developers, or other interested parties that handle errors or other data related conditions triggered as a result of a rule set 142 in a particular project 140.

As the various validations are performed for the validation projects 140 and rule sets 142, errors, invalid results, or other data related conditions (which may not be an error) that occur may trigger a reporting event 190 for the particular rule set 142/validation project 140. The responsive action to the triggered reporting event may be defined in the respective rule set. For example, a particular rule statement in a particular rule set (e.g., rule set(s) 142*a*), may describe a particular type of notification, escalation or alarm level, or some other action to be taken for a failure of that rule statement. In various embodiments, distributed data validation service 100 may implement reporting module 130 to facilitate the generation, transition, and management of various notification techniques to send reporting events 190 to project owners 150. For example, in some embodiments, reporting module 130 may aggregate reporting events stemming to a common failure or rule set 142 and include them in a single notification sent to a project owner 150.

Please note that previous descriptions are not intended to be limiting, but are merely provided as an example of network-based services, a relational data store, and distributed data validation service. For example, in some embodiments, a single data source, such as a network-based service may store data in a relational data store that may be evaluated according to one or more rule sets. Various other components may interact with or assist in enforcing network traffic policies including handles for network entity entries.

This specification next includes a general description of a provider network that implements multiple network-based services, which may collect and store service metrics for subsequent analysis. The provider network may also implement a distributed data validations service, which may validate data sets of service metrics stored in a data store. Then various examples of a distributed data validation service are discussed, including different components/modules, or arrangements of components/module that may be employed as part of implementing a distributed data validation service. A number of different methods and techniques to implement a distributed data validation service are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
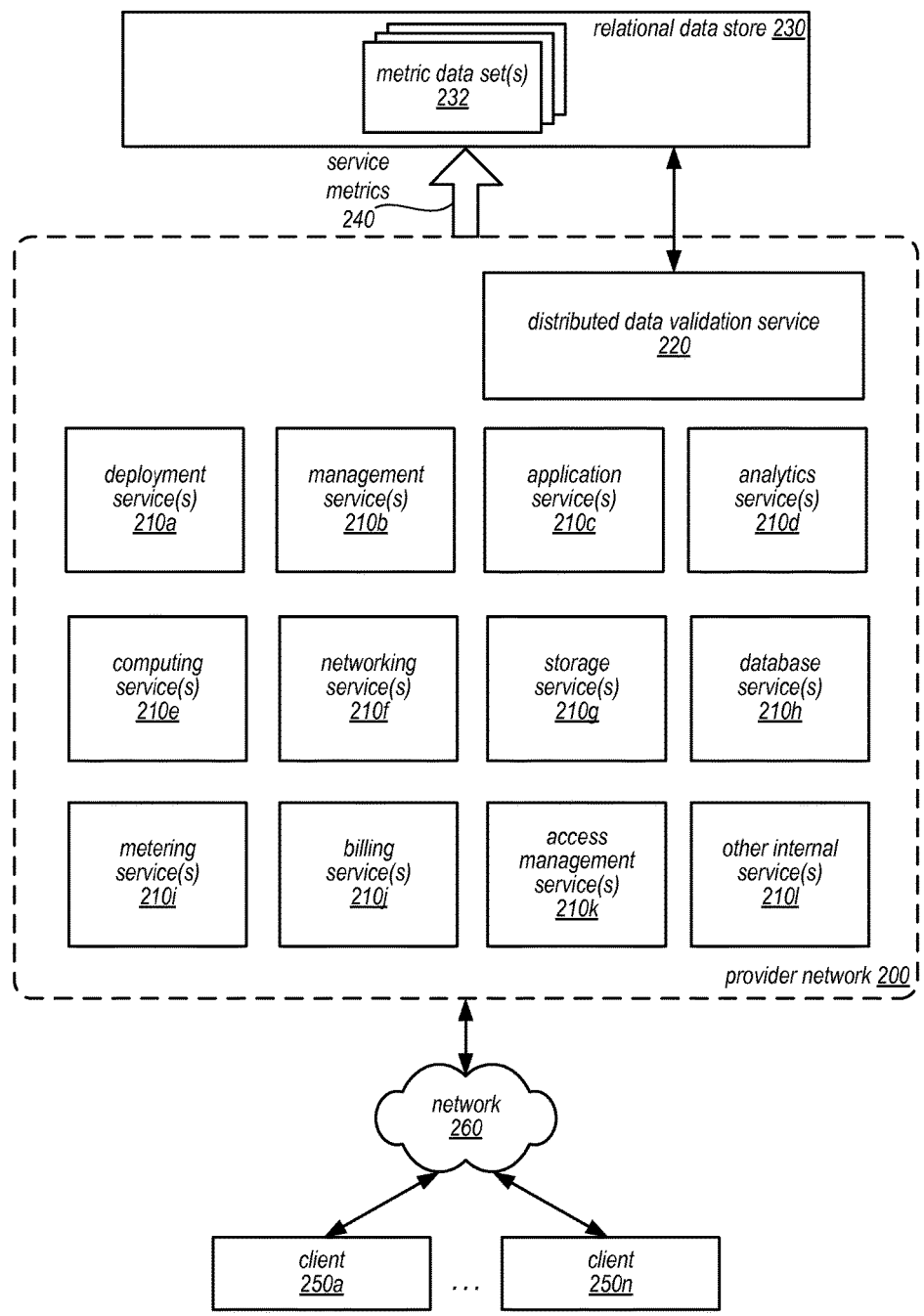
FIG. 2 is a block diagram illustrating a provider network implementing multiple network-based services that collect and store service metrics and a distribute data validation service which may validate the stored data sets of service metrics, according to some embodiments.

FIG. 2 is a block diagram illustrating a provider network implementing multiple network-based services that collect and store service metrics and a distribute data validation service which may validate the stored data sets of service metrics, according to some embodiments. Provider network 200 may be set up by an entity such as a company or a public sector organization to provide one or more services (such as various types of cloud-based computing or storage) accessible via the Internet and/or other networks to clients 250. Provider network 200 may include numerous data centers hosting various resource pools, such as collections of physical and/or virtualized computer servers, storage devices, networking equipment and the like, needed to implement and distribute the infrastructure and services offered by the provider network 200.

In some embodiments, provider network 200 may provide many different network-based services 210. Some of these network-based services may be publicly available to clients 250 of provider network 200. For example, deployment services 210*a*, management services 210*b*, application services 210*c*, analytics services 210*d*, computing services 210*e*, networking services 210*f*, storage services 210*g*, and database services 210*h* may provide services to clients 250 via network 260. Some network-based services 210 may be internal services utilized by other services within provider network 200. For example metering service(s) 210*i* and billing service(s) 210*j* may be used by other services, such as storage service(s) 210*g* to calculate certain metrics, such as usage metrics and/or billing metrics. Access management service(s) 210*k* may help configure access control policies for clients 250 for other services. Many other internal service(s) 210*l* may be implemented as well.

Client 250 usages of these services may, in various embodiments, generate service metrics 240 which are sent to be stored in relational data store 230. Service metrics may include metering and accounting information of client usage of network-based services, such as computing resources, storage resources, database resources, or other network-based resources. Usage information may be obtained by tracking the identities of requesting clients 250, the number and/or frequency of client requests, the size of data tables (or records thereof) stored or retrieved on behalf of clients 250, overall storage bandwidth used by clients 250, class of storage requested by clients 250, computing resource workload, database throughput, or, more generally any other measurable client usage parameter. Service metrics including usage data that may be queried and processed to generate reporting and billing metrics of client usage activity. Operational metrics, such as metrics reflecting the rates and types of requests received from clients 250, bandwidth utilized by such requests, system processing latency for such requests, system component utilization (e.g., network bandwidth and/or resource utilization within network-based services), rates and types of errors resulting from requests, characteristics of stored and requested data pages or records thereof (e.g., size, data type, etc.), or any other suitable metrics.

The service metrics 240 may be organized into particular data sets including service metrics, and may group particular types of data together. For example, a particular data set may describe customer usage data of computing resources provided by computing service(s) 210*e*, while another data set may describe billing information for computing service(s) 210*e*. Metric data set(s) 232 may be stored and organized in a variety of ways and, thus, may not be limited to the examples described above.

Figure 3:
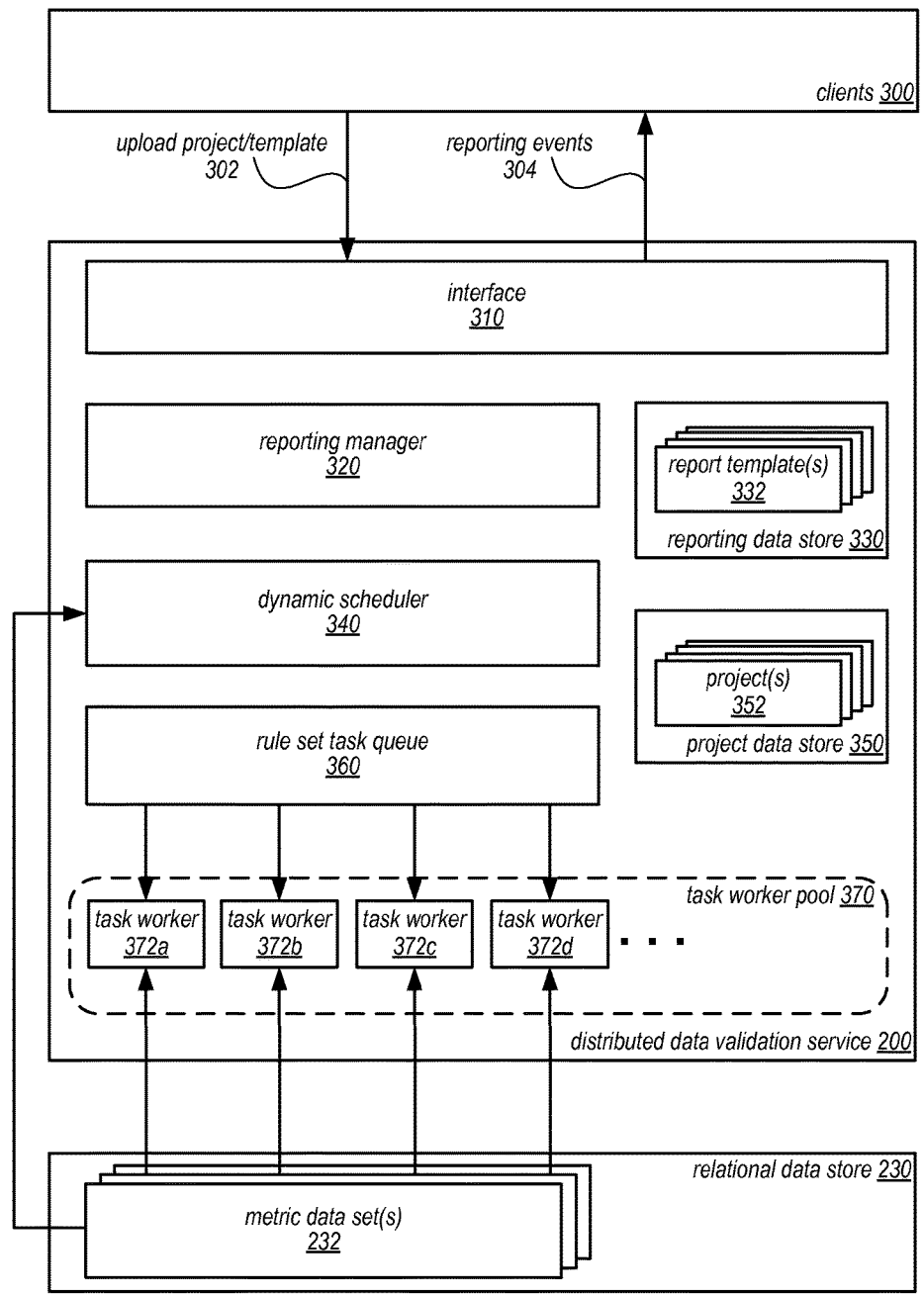
FIG. 3 is a block diagram illustrating a distributed data validation service, according to some embodiments.

Provider network 200 may, in some embodiments, implement distributed data validation service 220, to perform different validations of metric data set(s) 232 according to different stored rule sets. FIG. 3, described in more detail below, provides further discussion of the various ways in which distributed data validation service 220 may operate. Please note that while distributed data validation service 220 is illustrated as part of provider network 200, in some embodiments distributed data validation service 220 may be separately implement external to provider network 200, perhaps even controlled or operated by a different entity than the controlling entity of provider network 200. Similarly, relational data store 230 may be implemented within provider network 200, in some embodiments, such as by utilizing storage service(s) 210*g*, to store metric data set(s) 232.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment 1000 illustrated in FIG. 10 and described below. In various embodiments, the functionality of a given service system component (e.g., a component of the distributed data validation service 220, or other network-based services 210) may be implemented by a particular node or may be distributed across several nodes. In some embodiments, a given node may implement the functionality of more than one service system component (e.g., more than one distributed data validation service component).

Generally speaking, clients 250 may encompass any type of client configurable to submit network-based services requests to provider network 200 via network 260, including requests for network-based services (e.g., a request to generate a snapshot, etc.). For example, a given client 250 may include a suitable version of a web browser, or may include a plug-in module or other type of code module configured to execute as an extension to or within an execution environment provided by a web browser. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application configured to interact directly with provider network 200. In some embodiments, client 250 may be configured to generate network-based services requests according to a Representational State Transfer (REST)-style network-based services architecture, a document- or message-based network-based services architecture, or another suitable network-based services architecture.

Clients 250 may convey network-based services requests (e.g., allocate virtual block storage.) to and receive responses from provider network 200 via network 260. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

Generally speaking, provider network 200 may be configured to implement one or more service endpoints configured to receive and process network-based services requests, such as requests to start, stop, allocate, de-allocate, configure, or otherwise utilize network-based services. For example, provider network 200 may include hardware and/or software configured to implement a particular endpoint, such that an HTTP-based network-based services request directed to that endpoint is properly received and processed. In one embodiment, provider network 200 may be implemented as a server system configured to receive network-based services requests from clients 250 and to forward them to components of a system that implements the desired network-based service 210 for processing. In other embodiments, provider network 200 may be configured as a number of distinct systems (e.g., in a cluster topology) implementing load balancing and other request management features configured to dynamically manage large-scale network-based services request processing loads. In various embodiments, provider network 200 may be configured to support REST-style or document-based (e.g., SOAP-based) types of network-based services requests.

User authentication and access control procedures may be implemented for provider network 200, in some embodiments. For example, for a given network-based services request to create or modify a particular network-based service resource, access management service 210*k* may be configured to ascertain whether the client 250 associated with the request is authorized to create or modify the particular resource. It may be determined such as authorization by, for example, evaluating an identity, password or other credential against credentials associated with the particular database, or evaluating the requested access to the particular network-based system resource against an access control list for the particular resource. For example, if a client 250 does not have sufficient credentials to create or modify the particular resource, the corresponding network-based services request may be rejected, for example by returning a response to the requesting client 250 indicating an error condition. Various access control policies may be stored as records or lists of access control.

FIG. 3 is a block diagram illustrating a distributed data validation service, according to some embodiments. As noted above, distributed data validation service 200 may be configured to validate metric data set(s) 232 storing service metrics for network-based services implemented as part of a provider network. Additionally, distributed data validation service 200 may interact with clients 300 (which may be akin to clients 250 described above with regard to FIG. 2 or may be clients of distributed data validation service 200 (e.g., if distributed data validation service were separately implemented from a provider network).

As illustrated in FIG. 3, clients 300 may upload, send, or otherwise provide validation projects and/or reporting templates 302 to distributed data validation service 200. These uploaded validation projects and/or reporting templates may be respectively stored in project data store 350, storing active validation projects 352, and/or reporting data store 330, storing report template(s) 332. Please noted, that in various embodiments, reporting data store 330 and project data store 350 may be implemented as part of the same data store. In at least some embodiments, one or more data stores external to distributed data validation service 200 may be implemented (e.g., network-based storage service 210g described above with regard to FIG. 2).

In some embodiments, distributed data validation service 200 may implement interface 310 in order to provide various interfaces with distributed data validation service. For example, a network-based interface, such as a website, or other network accessible interface may be implemented to receive requests (e.g. upload 302) as well as report back information (e.g., reporting validation information 304). In some embodiments, interface 310 may be configured to receive requests formatted according to a programmatic interface (API) for distributed data validation service 200. A command line utility, or other application at clients 300 may be used to format requests according to the API and send them via a network (e.g., network 260 in FIG. 2) to interface 310.

Distributed data validation service may be configured to automatically apply rule sets to particular metric data set 232 in order to validate the particular metric data set 232, in various embodiments. For example, in at least some embodiments, distributed data validation service 200 may implement dynamic scheduler 340. Dynamic scheduler 340 may be configured to schedule tasks to perform various rule set validations dynamically. For instance, as discussed below with regard to FIG. 4, project(s) 352 may each include one or more rule sets. Projects 352 may also describe scheduling information for when the rule sets are to be performed or validated against a particular data set. Dynamic scheduler 340 may be configured to obtain from projects 352 scheduling information necessary to determine when a particular rule set is be applied, in some embodiments. Dynamic scheduler 340 may also be configured to detect, ascertain or otherwise determine when a particular condition or trigger is satisfied in order to schedule tasks for the result in response. For instance, if the scheduling instructions describe that the rule sets of the project are to be applied when X new data is stored in relational data store in the data set, then dynamic scheduler 340 may be configured to determine that new data has been stored in the particular data set, and may thus schedule the rule sets for performance by polling or querying metric data set(s) 232. In various embodiments, dynamic scheduler may first check whether various data dependencies for rule sets are valid (e.g., whether the data is ready/ripe for performing the validation). Realization values or other tables may be stored for metric data set(s) 232 in relational data store 230 in order to indicate whether data dependencies are valid, in some embodiments. Dynamic scheduler 340 may not rely or receive any manual input or indication to initiate the application of particular rule sets, in various embodiments. Instead, rule sets may be scheduled to be performed, validated, or applied automatically when the specified scheduling condition or information is met.

In a least some embodiments, distributed data validation service 200 may implement rule set task queue 360. Rule set task queue 360 may hold tasks to be performed as part of validating rule sets. These tasks may, in some embodiments, be particular sub elements of a particular rule in a rule set, a single rule, or a set of rules. Dynamic scheduler 340 may place tasks in rule set task queue 360 so as to affect a particular order or performance of tasks. In various embodiments, distributed data validation service 200 may implement a task worker pool 370 which may be a collection of nodes, systems, components, or other devices that may be configured to perform the tasks in rule set task queue 360 in order to validate the rule sets of projects 352. Task workers 372a, 372b, 372c and 372d each may be configured to perform any of the respective tasks in rule set task queue 360.

Task workers 372 may each have a respective capacity to perform a certain number of tasks at any given time. For instance, task worker 372a may have 5 parallel processing threads for performing tasks. As capacity to process tasks becomes available, task workers 372 may pull another task off of rule set task queue 360. If, in the above example, 2 of the 5 threads are free, then task worker 372a may pull the next two tasks off of rule set task queue 360 and begin performance. In at least some embodiments, task workers 372 may be configured to access the particular metric data set 232 corresponding to the rule set of the task they are performing. Additionally, task workers 372 may be configured to interact with any other systems or components necessary to implement a task. For example, task components may be configured to notify or provide results to reporting manager 320 of a validation failure for a particular rule in a rule set.

As the performance of applying rule sets to validate data sets is distributed across multiple task workers, efficient task performance may be achieved, as the tasks may be effectively load balanced evenly across the task workers 372. Moreover, in some embodiments, relational data store 230 may be configured to provide multiple copies of the same data set available for access (e.g., read replicas, mirroring groups, clusters or quorum sets). In this way, multiple task workers 372 may be able to operate on the same data set without interference or waiting, further increasing the performance of tasks.

As tasks are completed, and the success or failure of rule sets to validate becomes known. Reporting events may be triggered, in various embodiments, when at least one rule in a rule set is not validated (or when some other condition is met). In at least some embodiments, distributed data validation service 200 may implement reporting manager 320 to handle triggered reporting events. Reporting manager 320 may configured to perform responsive actions, such as providing notifications of the reporting event of the particular rule set or directing other systems (not illustrated) to generate reports or other data actions (which may only be performed if a rule set is validated). Responsive actions or notifications may be provided in many ways and may include various types of information, such as whether the reporting indicates a validation failure or error, or some other data related condition. For example, in some embodiments, a troubleshooting ticket system may be implemented that notifies responsible parties, administrators, or developers of the failed validation. Reporting manager 320 may be configured to open or create a new ticket indicating a validation error or other reporting event, and direct the sending of a ticket notification be made to the responsible parties. In some embodiments, a message (e.g., email, text message, or other electronic message) may be sent to provide the notification.

In some embodiments, as discussed below with regard to FIG. 4, rules in the rule set may define the particular responsive action to take in response to a validation failure or other condition as indicated by the rule/rule set. In some embodiments, the action may indicate that a particular alarm or severity code be attached to a ticket or indicated in another communication, such as an email, that is provided. Reporting manager 320 may be configured to access or obtaining the response action indicated in the rule when generating or directing the action for the reporting event. In some embodiments, reporting manager 320 may store a notification in a table or other location instead of or in addition to providing a notification. In at least some embodiments, reporting manager 320 may be configured to aggregate indications of reporting events to an open ticket or communication that are related to the same rule set or error. For example, if a particular error triggers 30 different rule validation failures, then instead of sending 30 separate notifications, a single notification including the 30 different validation failures may be provided. In some embodiments, reporting manager 320 may be configured to utilize a client 300 provided report template 332 when sending notifications to the particular client 300. Report template 332 may specify information to include (or not include) in the notification, who to notify, the particular format, or any other data or information in the notification.

Figure 4:
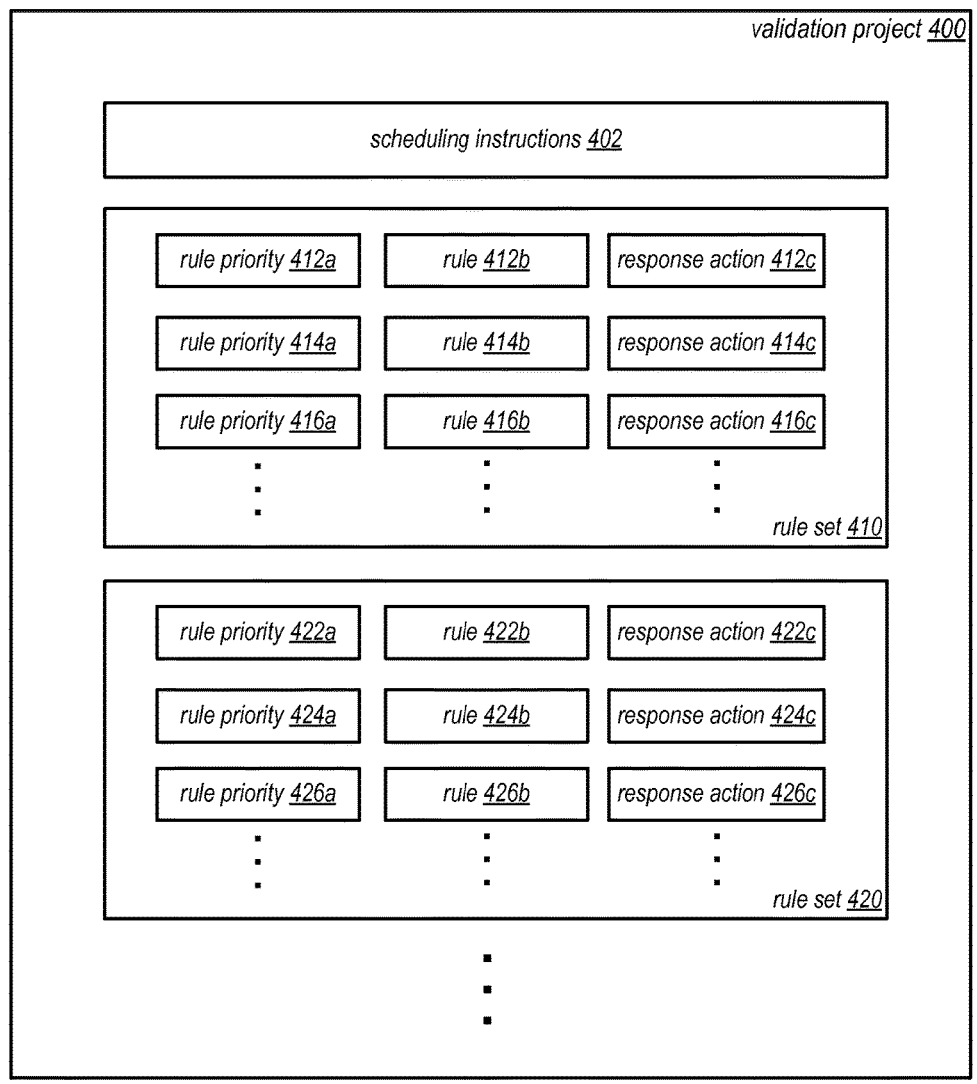
FIG. 4 is an example of a validation project including one or more rule sets for validating particular data sets, according to some embodiments.

FIG. 4 is an example of a validation project including one or more rule sets for validating particular data sets, according to some embodiments. Validation projects may contain one, or more multiple, rule sets to perform various validations of different data sets. Typically, rule sets in a validation project may be related, but may also be directed toward one or more different data sets. However, in some embodiments, multiple rule sets in a validation project may be directed toward the same data set. Thus, the previous examples are not intended to be limiting. Adding new rule sets (or removing rule sets) may not break or inhibit the performance of other rule sets in a validation project. As illustrated in FIG. 4, scheduling instructions 402 are implemented as part of validation project 400. Scheduling instructions 402 may be applied to each of the performance/application of rule sets in a validation project. For example, scheduling instructions 402 are applicable to rule set 410 and rule set 420. Scheduling instructions 402 may, in some embodiments describe a condition or timing at which rule sets are applied. For example, validation project 400 may be scheduled to execute whenever certain new data stored in the relational database. In some embodiments, particular time intervals may be described, such as performing every 15 min, or once a day. In various embodiments, scheduling instructions 402 may indicate different data dependencies for each rule set. Some rule sets may have different data dependencies, while other data dependencies may be the same for other rule sets, in various embodiments.

Rule sets may be individual files or data objects that are associated with a particular validation project. For example, a rule set may be described in a rule set file that is located in a folder or other storage location associated with a particular validation project. In at least some embodiments, rule set files may be described in JavaScript Object Notation (JSON), where individual rules, response actions, or priority indications may also be described. A rule in a rule set may be a particular assertion or statement that may be valid or invalid about a particular data set, in some embodiments. In some embodiments, Structured Query Language commands or other database functions of the relational data store maintaining the data sets may be used to identify data or conditions to assert against. Different types of assertions may be implemented. Integrity assertions may, in some embodiments, be made. An integrity assertion may compare the identified data or condition in the rule with other particular conditions. If the conditions match, then a reporting event may be triggered in some embodiments. For example, identified data or conditions may be NULL or NOT NULL, equal to some VALUE, less than some VALUE, greater than some VALUE, return a particular value in a function, or equal one or more conditions. Another type of validation assertion may be a cross table validation, which may compare two tables, views, or queries of different data sets and trigger a reporting event based on certain differences. Another type of assertion may be a chronological validation. Data for a particular time may be stored in a cache location in addition to the storage location. If the data for the particular time is overwritten the next data with different data, then the amount of change may trigger a reporting event.

In addition to assertions, rules may also indicate respective response actions, such as response action 412*c*, 414*c*, 416*c*, 422*c*, 424*c*, and 426*c*, corresponding respectively to rules 412*b*, 414*b*, and 416*b* in rule set 410 and rule 422*b*, 424*b*, and 426*b* in rule set 420. Response actions may designate a particular type of response (e.g., email or ticket) to take if a validation failure occurs. In some embodiments rules may have an explicit or an implicit priority, such as rule priority 412*a*, 414*a*, 416*a*, 422*a*, 424*a*, and 426*a*. Priority may indicate the relative importance of a particular validation. In some embodiments, if a higher priority validation fails, then other rules may not be validated at all. For example, if 2 rules each describe an assertion that a particular value is not over 70% or 30%, then when the rule for the 70% fails, the 30% assertion may not be validated at all. In various embodiments, multiple rules may be included in a rule set, such as rules 412*b*, 414*b*, and 416*b* in rule set 410 and rule 422*b*, 424*b*, and 426*b* in rule set 420.

Figure 5:
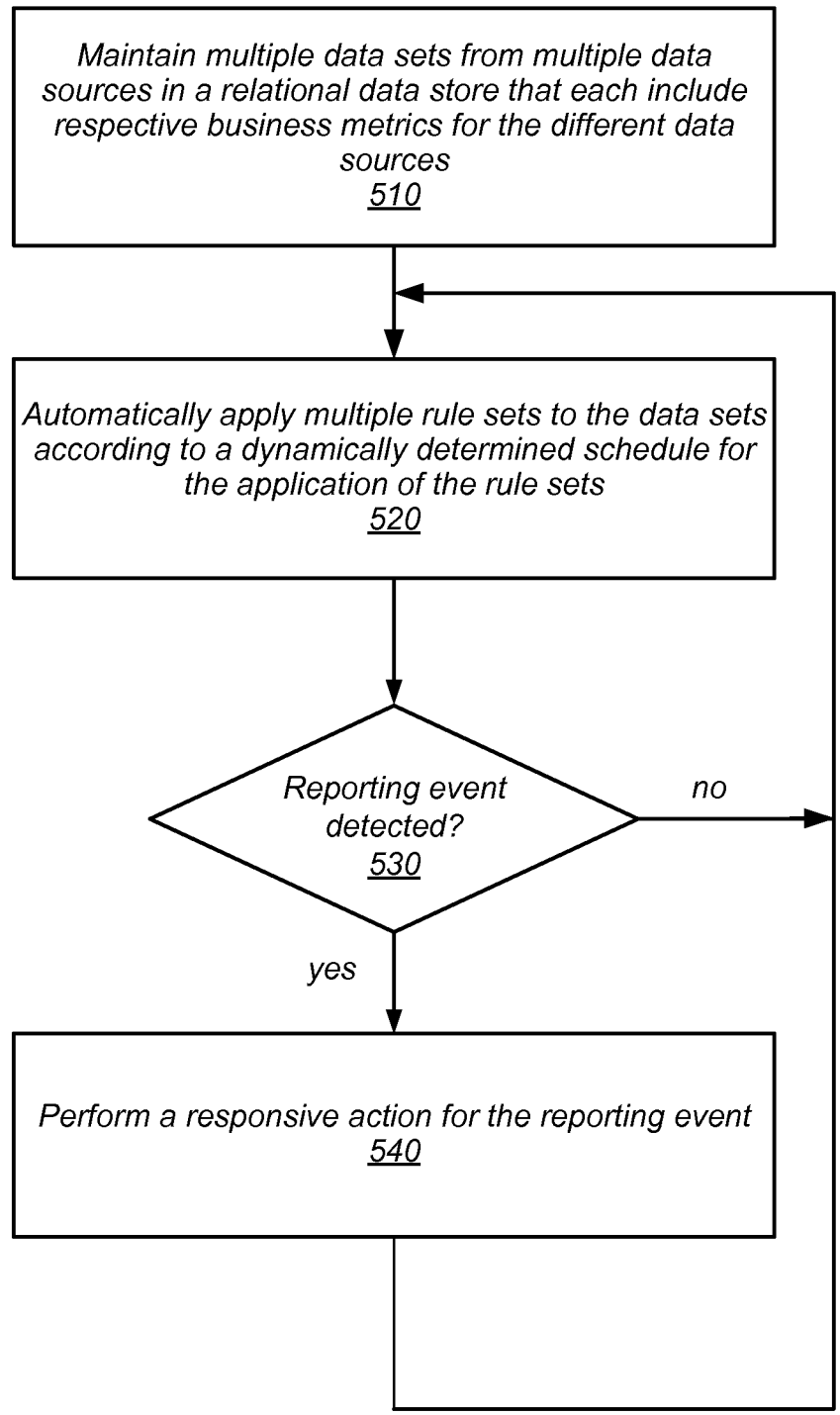
FIG. 5 is high-level flowchart illustrating various methods and techniques for implementing a distributed data validation service, according to some embodiments.

The examples of implementing a distributed data validation service discussed above with regard to FIGS. 1-4 have been given in regard to service metrics recorded network-based services of a provider network. However, various other types or data sets from other data sources may be validated when implementing these techniques. FIG. 5 is high-level flowchart illustrating various methods and techniques for implementing a distributed data validation service, according to some embodiments. These techniques may be implemented using various components of distributed data validation service as described above with regard to FIGS. 1-4 or other provider system architectures or components. Although multiple data sets and multiple rule sets are referred to in FIG. 5 and subsequent figures, the same techniques may be applied to a single rule set, data set and/or data source, in some embodiments.

As indicated at 510, multiple data sets from multiple different data sources may be maintained in a relational data store, in various embodiments. Each of these data sets may include respective business metrics (or other types of data or metrics) for the different data sources. For example, a multi-site distribution system may collect certain metrics form various different sources and maintained them in a relational data store (e.g., a relational database) for subsequent analysis.

Multiple rule sets used to validate particular data sets in the data store may be applied, as indicated at 520. These rule sets may be applied according to a dynamically determined schedule for the application of data sets. For example, each rule set may have their own respective scheduling instructions that may, in some embodiments describe a condition or timing at which rule sets are applied. Some rule sets may be scheduled to execute whenever certain new data stored in the relational database. Other rule sets may be scheduled according to particular time intervals, such as performing every 15 min, or once a day. Rule set application may be performed automatically, without any request or manual input to perform the test. In some embodiments, rule sets may be applied as dynamically scheduled in perpetuity, or until the rule set is deleted or removed. In at least some embodiments, rule sets may me scheduled to be performed when a respective data dependency is valid (e.g., indicating that the one or more data sources validated by the rule set are ready to be validated).

As result of performing the validations described in the rule sets, reporting events may be detected indicating validation failures for a particular rule set, as indicated at 530. If none are currently detected, as indicated by the negative exit from 530, then validations may continue as scheduled. For detected events, responsive actions may be performed that are indicated by the corresponding rule set that triggered the reporting event, as indicated at 540. For example, notifications may be provided indicating the validation failure that triggered the reporting event, in some embodiments. Consider the scenario where a rule set may monitor the delay between writes to a master database and copies of the writes being delivered to a slave database. If a rule of the rule set fails, then the reporting event may indicate a validation failure that the transfer delay between the two databases was too great, exceeding the delay tolerance threshold. Responsive actions that are notifications may be provided in many ways. For example, in some embodiments a ticket may be created in a ticket troubleshooting system that notifies appropriate developer's, administrators, or other stakeholders. Similarly, in some embodiments, messages may be sent (e.g., emails) indicating the validation failure. As discussed below with regard to FIG. 9, sometimes these notifications may be combined for related failures, in some embodiments.

Figure 6:
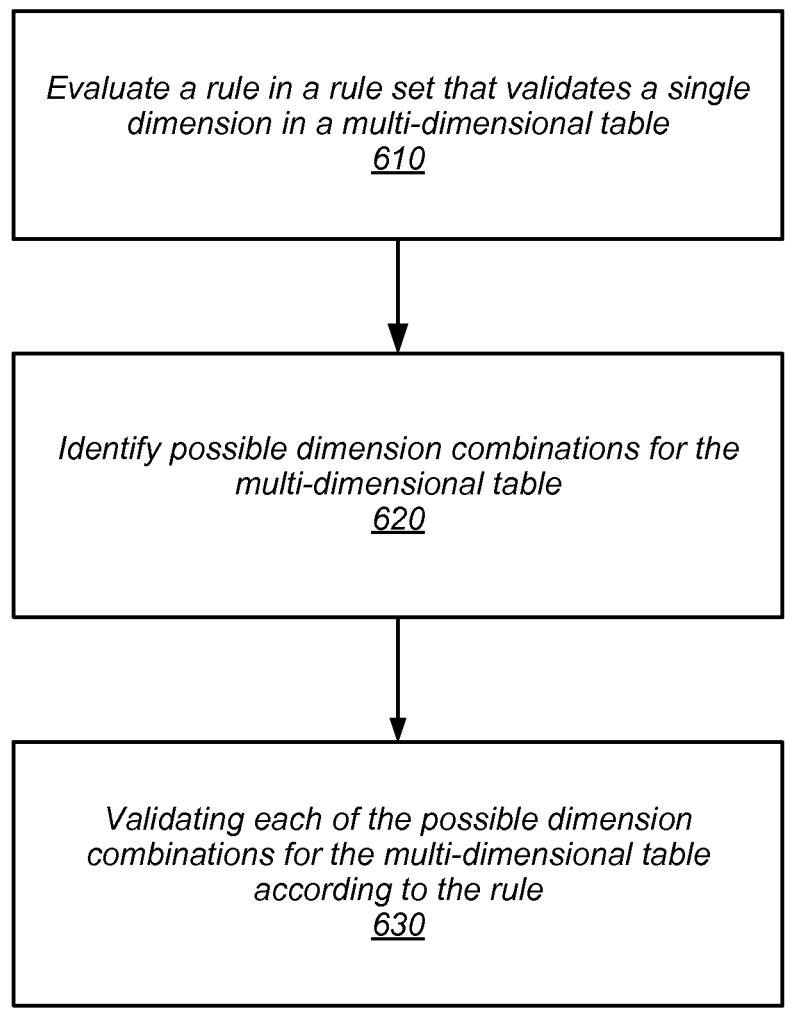
FIG. 6 is a high-level flowchart illustrating various methods and techniques for performing automated multi-dimensional table evaluations, according to some embodiments.

FIG. 6 is a high-level flowchart illustrating various methods and techniques for performing automated multi-dimensional table evaluations, according to some embodiments. In at least some embodiments, multi-dimensional data table in the data sets may be stored. These multi-dimensional data tables may provide many different views of data to be aggregated, evaluated, or examined. In various embodiments, a rule set, or a rule in a rule set, may be implemented to evaluate a particular dimension of a multi-dimensional data table. The distributed data validation service may be configured to implement the following techniques to provide the same evaluation for other possible dimensions of the same multi-dimensional data table, so that individual rules to check these combinations need not be created.

As indicated at 610, a rule in a rule set that validates a single dimension in a multi-dimensional table maybe evaluated. For example, the rule may check for missing data, look for out-of-bounds values, or any other integrity validation that may be performed (as discussed above at FIG. 4). Possible dimension combinations for the multi-dimensional table may then be identified, as indicated at 620. For example, if 3 dimensions are available in table, called dimensions A, B, and C, then the various combinations of these dimensions may be identified (A, AB, AC, ABC, B, BC, C). In some embodiments, the rule may specify which dimensions to use to identify combinations. Continuing with the example above, the rule may indicate that only dimensions A, B and C be considered out of total dimensions A through N. In some embodiments, the dimensions to consider may be identified by various machine learning or recommendation techniques, or other information provided by a rule set. Thus, identifying possible dimension combinations may include various techniques to calculate, select, recommend, or other method of choosing particular dimensions from which the possible dimension combinations may be identified. Once identified, the same validation (e.g., the same rule, assertion, or evaluation) may be made with respect to each of these possible combinations according to the rule, as indicated at 630. In this way, a more fine-grained validation technique may be performed on the multi-dimensional table, without having a user develop separate rules or rule sets for the other combinations. This technique may be performed automatically, without request, or upon request, as specified in the rule set.

Figure 7:
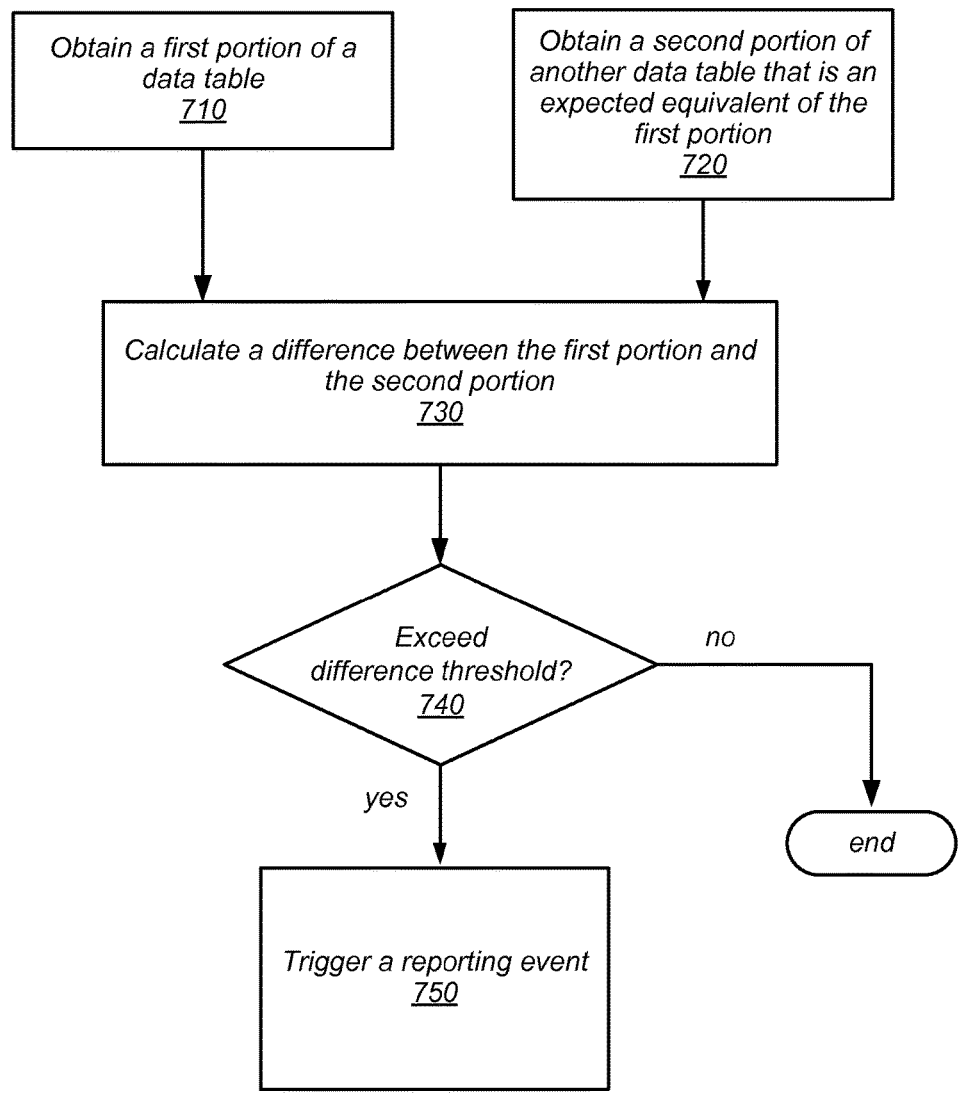
FIG. 7 is a high-level flowchart illustrating various methods and techniques for detecting a cross table data variance, according to some embodiments.

FIG. 7 is a high-level flowchart illustrating various methods and techniques for detecting a cross table validation, according to some embodiments. Sometimes data processing or manipulation may cause data to be lost or erroneously modified. In some scenarios, an original data source may remain. For example, in some embodiments, aggregation tables may be created from detail tables, which provide data for a specific part of the aggregation table. A cross table validation may be made to ensure that no errors occurred when processing the data from the original source (e.g., creating the aggregation table). Please note, that such techniques may equally be helpful to detect data corruption or error on the source data table. Thus, the previous examples are not intended to be limiting.

As indicated at 710, a first portion of a data table may be obtained. Note that a portion may include all of the table. As indicated at 720, a second portion of another data table that is expected to be equivalent of the first portion may be obtained. Note, that the data for the two data tables may be obtained from the same or different respective data sources, in some embodiments. Thus, for rules in rule sets implementing a cross table validation data dependencies may include the respective data sets for the two data tables. For example, if two queries were made to obtain each of the portions, it would be expected that the queries would return the same results. As indicated at 730, a difference calculation may be performed between the first portion and the second portion. This difference calculation may identify different records, portions of records, or larger groupings of data, and produce either an absolute difference value or difference percentage value, in some embodiments. The difference value may then be evaluated with respect to a difference threshold, as indicated at 840. In some embodiments the difference threshold may be 0, that is no difference is acceptable, while in other embodiments higher percentage or absolute value may be used (which may be determined to be at a point where the differences make little statistical difference to subsequent data analysis). As indicated by the positive exit from 840, a reporting event may be triggered for exceeding the threshold, as indicated at 850. If the threshold is not exceeded, then no action may be taken, as indicated by the negative exit from 840.

Figure 8:
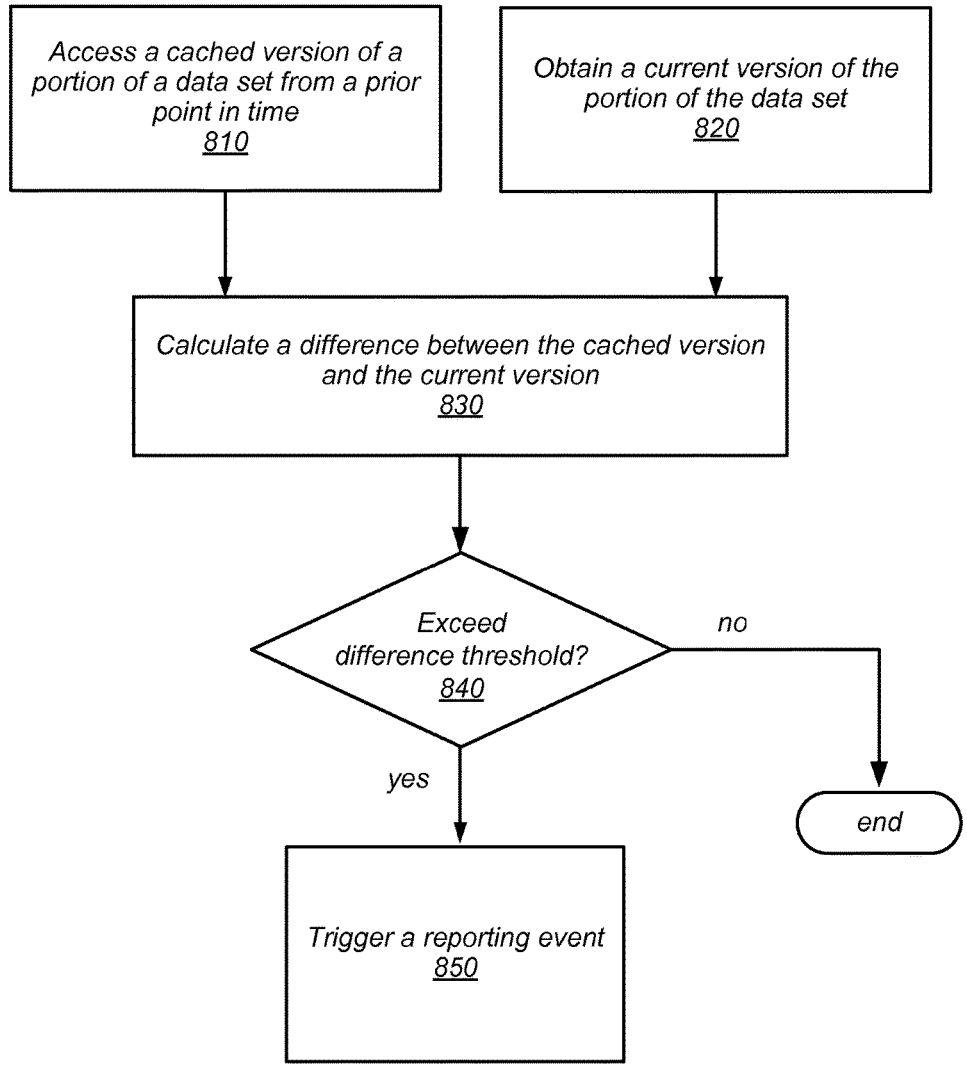
FIG. 8 is a high-level flowchart illustrating various methods and techniques for detecting a chronological failure for a particular data set, according to some embodiments.

FIG. 8 is a high-level flowchart illustrating various methods and techniques for detecting a chronological failure for a particular data set, according to some embodiments. There may be occurrences where data that was previously stored in a data set was inaccurate for various reasons. In such cases, some data may be manually overwritten in order to be corrected (sometimes referred to as a restatement). In order to identify when such changes occur, in some embodiments, rule sets may validate data for chronological failures.

As indicated at 810, a cached version of a portion of a data set from a prior point in time may be accessed, in some embodiments. Some service or business metrics may be more prone to restatement than others (e.g., financial data). For such data, a secondary storage system, such as a database service (e.g., one of the database services offered in provider network 200 described above with regard to FIG. 2), may be used to retain a cached version of the data. This cached version may have a timestamp or other indicator associated with it that provides the historic information necessary to determine changes to the data over time. In some embodiments, the results of a query or other indicated data in the rule set may be stored (which may or may not include storing all of the data of a data set). Thus, the version of the portion of the data in the data set in the relational data store may be accessed and retrieved. As indicated at 820, a current version of the portion of the data may be obtained, in various embodiments.

As indicated at 830, a difference calculation may be performed between the cached version and the current version of the data. This difference calculation may identify different records, portions of records, or larger groupings of data, and produce either an absolute difference value or difference percentage value, in some embodiments. The difference value may then be evaluated with respect to a difference threshold, as indicated at 840. As discussed above, in some embodiments the difference threshold may be 0, that is no difference is acceptable, while in other embodiments higher percentage or absolute value may be used (which may be determined to be at a point where the differences make little statistical difference to subsequent data analysis). As indicated by the positive exit from 840, a reporting event may be triggered for exceeding the threshold, as indicated at 850. If the threshold is not exceeded, then no action may be taken, as indicated by the negative exit from 840.

Figure 9:
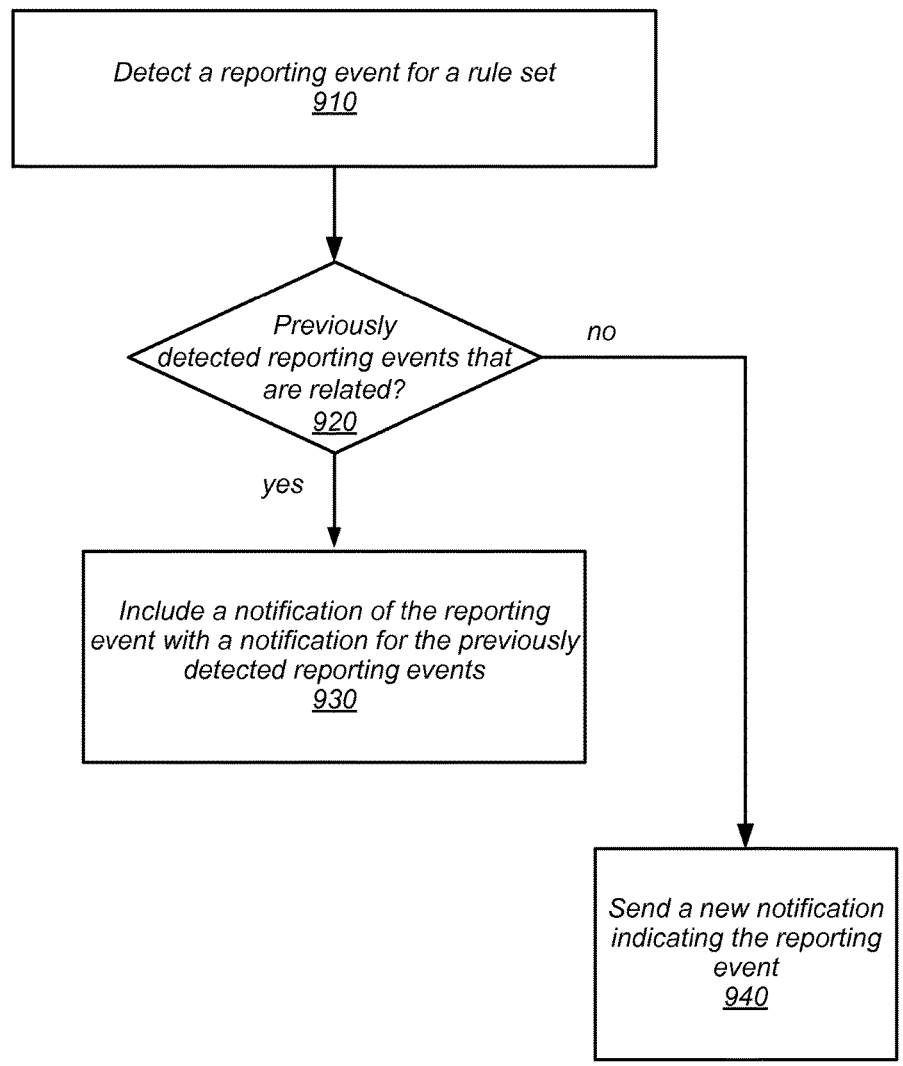
FIG. 9 is a high-level flowchart illustrating various methods and techniques for performing notification aggregation, according to some embodiments.

FIG. 9 is a high-level flowchart illustrating various methods and techniques for performing notification aggregation, according to some embodiments. As noted above with regard to reporting module 320 in FIG. 3, there may be instances where a single failure or data condition or set of failures or data conditions that are related may trigger multiple reporting events. Rather than overwhelming a developer, administrator, or stakeholder with multiple notifications, some notifications for reporting events may be combined.

As indicated at 910, a triggering event for a rule set may be detected. The trigger event may identify the rule (such as the validation failure or other detected data condition) as well as the portion of data in the data set that triggered the reporting event, in some embodiments. It may then be determined whether a previously detected reporting event(s) that is related to the current reporting event has been determined, as indicated at 920. In some embodiments, a ticket troubleshooting system may be implemented such that a ticket may be opened or created when a reporting event is identified. If a ticket is already open as a result of the same failure cause or other data condition, then it may be determined that the reporting event is related to the failure (or failures or data conditions) on the open ticket. In some embodiments, notifications may be continually added to the same ticket for new reporting events until the ticket is closed. More generally, if the reporting event belongs to the same data set, portion of data, type of test, or other indicator of relatedness (e.g., if one test fails because a value is below 20%, then it follows that a test that fails if the same value is below 10% are related to the same value), then the reporting event may be determined to be related to the previous reporting events.

If previously detected reporting events are related, as indicated by the positive exit from 920, then a notification of the reporting event is included in the notification for the previously detected reporting events, as indicated at 930. For example, if an email or text message, or other message, is used as notification, then details for the reporting event may be included in the message along with the details of the previous reporting events. If no previously detected reporting events are related, then a new notification may be sent, as indicated at 940. For example, a new ticket may be opened in a troubleshooting ticketing system or a new message sent (e.g., email) indicating the reporting event.

The methods described herein may in various embodiments be implemented by any combination of hardware and software. For example, in one embodiment, the methods may be implemented by a computer system (e.g., a computer system as in FIG. 10) that includes one or more processors executing program instructions stored on a computer-readable storage medium coupled to the processors. The program instructions may be configured to implement the functionality described herein (e.g., the functionality of various servers and other components that implement the data validation service described herein). The various methods as illustrated in the figures and described herein represent example embodiments of methods. The order of any method may be changed, and various elements may be added, reordered, combined, omitted, modified, etc.

Figure 10:
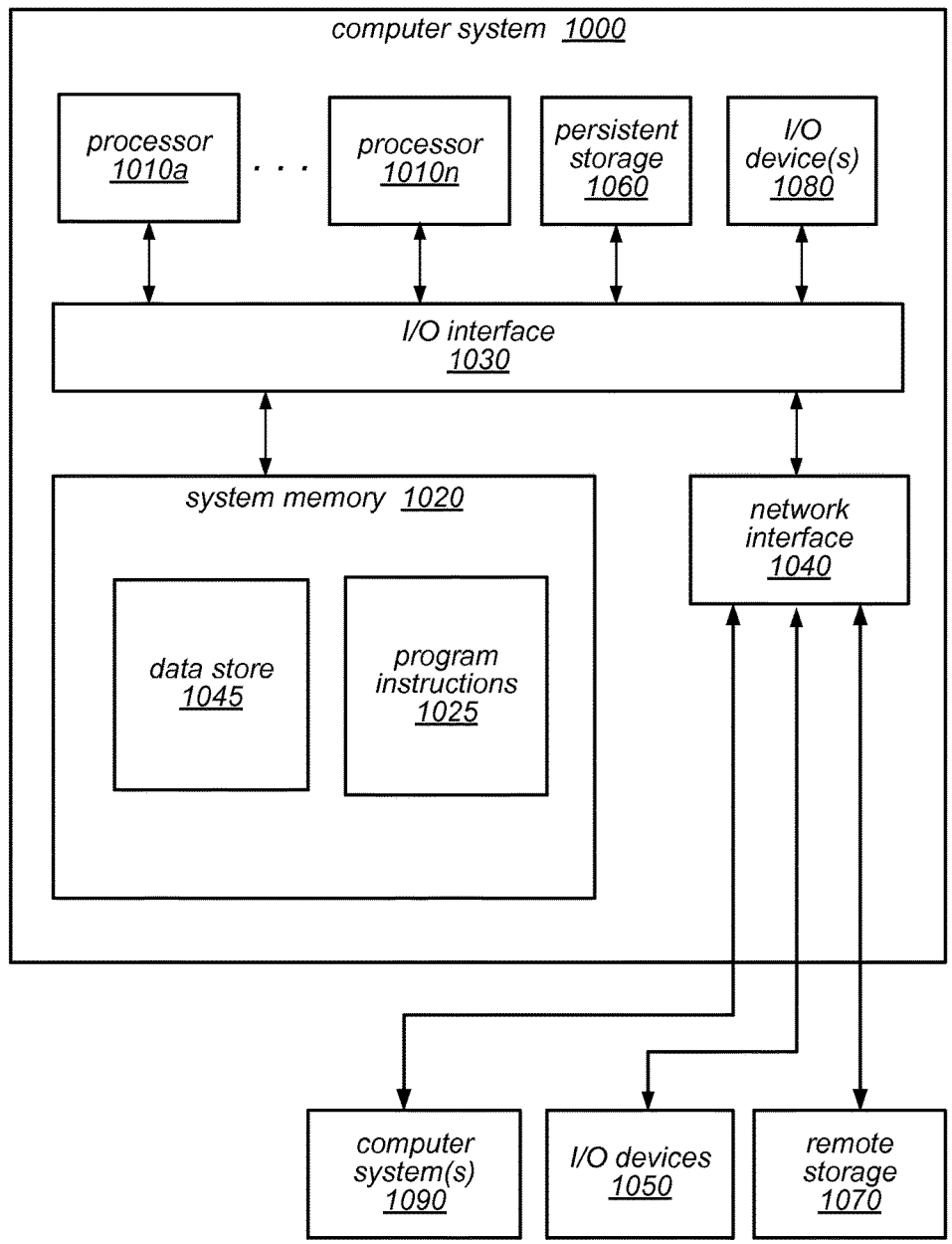
FIG. 10 is a block diagram illustrating an example computing system, according to some embodiments.

Embodiments of a distributed data validation service as described herein may be executed on one or more computer systems, which may interact with various other devices. FIG. 10 is a block diagram illustrating an example computer system, according to various embodiments. For example, computer system 1000 may be configured to implement nodes of a network-based service, distributed data validation service, and/or a client, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the distributed data validation service described herein. In another example, an instance of a server application executing on computer system 1000 may use network interface 1040 to communicate with other instances of the server application (or another server application) that may be implemented on other computer systems (e.g., computer systems 1090).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that are configured to store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a distributed data validation service, in different embodiments. In some embodiments, program instructions 1025 may implement multiple separate clients, server nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. In general, system memory 1020 (e.g., data store 1045 within system memory 1020), persistent storage 1060, and/or remote storage 1070 may store data blocks, replicas of data blocks, metadata associated with data blocks and/or their state, configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090 (which may implement one or more storage system server nodes, database engine head nodes, and/or clients of the database systems described herein), for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 10 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
   a relational data store configured to store respective data sets that are received from respective ones of a plurality of network-based services of a provider network, wherein each of the respective data sets comprises service usage metrics for a respective one of the plurality of network-based services; and
   a plurality of hardware compute nodes that together implement a distributed data validation service that provides a service interface for a plurality of clients;
   wherein the distributed data validation service is configured to:
      receive, via the service interface from each of multiple clients of the plurality of clients, a respective validation project indicating respective one or more service metric validation rule sets corresponding to a respective one or more of the data sets;
      automatically apply each of the respective one or more service metric validation rule sets to validate the service usage metrics of the respective ones of the one or more data sets according to a dynamically determined schedule for the automatic application of each of the respective one or more service metric validation rule sets,
      wherein the one or more service metric validation rule sets comprise one or more rules for identifying one or more errors in the service usage metrics included in the data set being validated, wherein the one or more errors comprise corrupt data, lost data, or erroneously modified data,
      wherein the distributed data validation service is configured to assign different ones of the service metric validation rule sets to different task workers implemented on different ones of the hardware compute nodes of the distributed data validation service according to the dynamically determined schedule to validate the one or more data sets;
      detect at least one reporting event based on identifying one or more errors in the service usage metrics included in one or more of the respective ones of the data sets being validated, wherein the at least one reporting event corresponds to a particular service metric validation rule set of the respective one or more service metric validation rule sets, wherein the one or more errors comprise corrupt data, lost, data, or erroneously modified data;
      in response to the detection of the at least one reporting event, perform a responsive action as indicated by the particular service metric validation rule set, wherein the system is configured to perform subsequent analysis, aggregation, or reporting of the service usage metrics included in the one or more data sets that have been validated.

2. The system of claim 1, wherein to automatically apply each of the one or more service metric validation rule sets to validate the service usage metrics of the respective ones of the one or more data sets, the distributed data validation service is configured to:

wherein at least one rule set of the one or more service metric validation rule sets comprises a rule validating one dimension of a multi-dimensional table in the respective data set;

for the at least one rule set:
identify one or more possible dimension combinations for the multi-dimensional table; and
validate each of the one or more possible dimension combinations according to the rule validating the one dimension of the multi-dimensional table.

3. The system of claim 1,
wherein the distributed data validation service is further configured to determine that the reporting event is related to one or more previously determined reporting events prior to the performance of the responsive action for the event; and
wherein to perform the responsive action, the distributed data validation service is configured to include a notification of the reporting event with a notification for the one or more previously determined reporting events that is subsequently sent.

4. The system of 1, wherein individual tasks included in the automatic application of each of the one or more rule sets are distributed evenly among the plurality of task workers.

5. A method, comprising:
performing, by one or more computing devices of a distributed data validation service:
receiving, via a service interface and from multiple clients of a plurality of clients of the distributed data validation service, a respective validation project indicating respective one or more service metric validation rule sets corresponding to respective one or more data sets received from respective network-based services of a plurality of different network-based services of a provider network, wherein the one or more data sets comprise service usage metrics for the respective network-based services;
accessing a respective one or more of the data sets stored in a relational data store, wherein the one or more data sets are received from respective ones of the plurality of different network-based services corresponding to a respective validation project, wherein each of the one or more data sets comprises respective service usage metrics for a respective one of the plurality of different network-based services;
automatically applying each of the respective one or more service metric validation rule sets to validate the service usage metrics of the respective ones of the one or more data sets according to a dynamically determined schedule for the automatic application of each of the respective one or more service metric validation rule sets, wherein the one or more service metric validation rule sets comprise one or more rules for identifying one or more errors in the service usage metrics included in the data set being validated, wherein the one or more errors comprise corrupt data, lost data, or erroneously modified data, and wherein the distributed data validation service is configured to assign different ones of the service metric validation rule sets to different task workers implemented on different ones of a plurality of hardware compute nodes of the distributed data validation service according to the dynamically determined schedule to validate the one or more data sets;
detecting at least one reporting event based on identifying one or more errors in the service usage metrics included in the one or more data sets being validated, wherein the one or more errors in the one or more data sets comprise corrupt data, lost data, or erroneously modified data, and wherein the at least one reporting event corresponds to a particular service metric validation rule set of the respective one or more service metric validation rule sets;
in response to detecting the at least one reporting event, performing a responsive action as indicated by the particular service metric validation rule set; and
performing subsequent analysis, aggregation, or reporting of at least some of the service usage metrics included in the one or more data sets that have been validated.

6. The method of claim 5, wherein said automatically applying each of the one or more service metric validation rule sets to validate the service usage metrics of the respective ones of the one or more data sets comprises:

wherein at least one service metric validation rule set of the one or more service metric validation rule sets comprises a rule validating one dimension of a multi-dimensional table in the respective data set;

for the at least one rule set:
identifying one or more possible dimension combinations for the multi-dimensional table; and
validating each of the one or more possible dimension combinations according to the rule validating the one dimension of the multi-dimensional table.

7. The method of claim 5, wherein said automatically applying each of the one or more service metric validation rule sets to validate the service usage metrics of the respective ones of the one or more data sets comprises:

for the particular service metric validation rule set:
obtaining a first portion of one data table from the one or more data sets;
obtaining a second portion of another data table from the one or more data sets, wherein the second portion is an expected equivalent of the first portion; and
calculating a difference between the first portion and the second portion; and
in response to determining that the difference between the first portion and the second portion exceed a difference tolerance threshold, triggering the reporting event.

8. The method of claim 5, wherein the reporting event is a validation failure that indicates a synchronization delay between a primary database and a slave database.

9. The method of claim 5, wherein the particular rule set comprises a plurality of rules, and wherein said applying each of the one or more rule sets to validate the service usage metrics of the respective ones of the one or more data sets comprises:

for the particular rule set, individually applying the rules according to a priority order such that at least one of the plurality of rules is not applied to the service usage metrics of the respective ones of the one or more data sets after detecting the reporting event.

10. The method of claim 5, wherein said automatically applying each of the one or more service metric validation rule sets to validate the service usage metrics of the respective ones of the one or more data sets comprises:
for the particular rule set:
  accessing a cached version of a portion of a data set of the one or more data sets from a prior point in time;
  obtaining a current version of the portion of the data set;
  calculating a difference between the cached version and the current version; and
  in response to determining that the difference exceeds a difference tolerance threshold, triggering the reporting event.

11. The method of claim 5, further comprising:
prior to performing the responsive action for the detected at least one reporting event, determining that the at least one reporting event is related to one or more previously determined reporting events; and
wherein said performing the responsive action for the detected at least one reporting event comprises including a notification of the reporting event with a notification for the one or more previously determined reporting events that is subsequently sent.

12. The method of claim 5, wherein the one or more service metric validation rule sets are each described in a declarative human-readable markup language.

13. A non-transitory, computer-readable storage medium, storing program instructions that when executed by one or more computing devices cause the one or more computing devices to implement:
receiving, via a service interface and from multiple clients of a plurality of clients, a respective validation project indicating respective one or more service metric validation rule sets corresponding to respective one or more data sets received from a respective network-based service of a plurality of different network-based services of a provider network;
accessing a respective one or more data sets stored in a relational data store that are received from respective ones of the plurality of different network-based services corresponding to a respective validation project, wherein each of the one or more data sets comprises respective service usage metrics for a respective one of the plurality of different network-based services;
automatically applying each of the respective one or more service metric validation rule sets to validate the service usage metrics of the respective ones of the one or more data sets according to a dynamically determined schedule for the automatic application of each of the respective one or more service metric validation rule sets;
wherein the one or more service metric validation rule sets comprise one or more rules for identifying one or more errors in the service usage metrics included in the one or more data sets being validated, wherein the one or more errors comprise corrupt data, lost data, or erroneously modified data,
wherein said automatically applying each of the respective one or more service metric validation rules to validate the service usage metrics, is performed by a distributed data validation service configured to assign different ones of the service metric validation rule sets to different task workers implemented on different ones of a plurality of hardware compute nodes of the distributed data validation service according to the dynamically determined schedule;
detecting at least one reporting event based on identifying one or more errors in the service usage metrics included in the one or more data sets being validated, wherein the one or more errors comprise corrupt data, lost data, or erroneously modified data, and wherein the at least one reporting event corresponds to a particular service metric validation rule set of the respective one or more service metric validation rule sets;
in response to detecting the at least one reporting event, performing a responsive action as indicated by the particular service metric validation rule set; and
causing the metrics of the respective ones of the one or more data sets to be stored as validated service usage metrics, wherein subsequent analysis, aggregation, or reporting is performed on at least some of the validated service usage metrics.

14. The non-transitory, computer-readable storage medium of claim 13, wherein, in said automatically applying each of the one or more service metric validation rule sets to validate the service usage metrics of the respective ones of the one or more data sets, the program instructions cause the one or more computing devices to implement:
wherein at least one rule set of the one or more service metric validation rule sets comprises a rule validating one dimension of a multi-dimensional table in the respective data set;
for the at least one rule set:
  identifying one or more possible dimension combinations for the multi-dimensional table; and
  validating each of the one or more possible dimension combinations according to the rule validating the one dimension of the multi-dimensional table.

15. The non-transitory, computer-readable storage medium of claim 13, wherein the particular service metric validation rule set comprises a plurality of rules, and wherein, in said applying each of the one or more service metric validation rule sets to validate the service usage metrics of the respective ones of the one or more data sets, the program instructions cause the one or more computing devices to implement:
for the particular service metric validation rule set, individually applying the rules according to a priority order such that at least one of the plurality of rules is not applied to the service usage metrics of the respective ones of the one or more data sets after detecting the reporting event.

16. The non-transitory, computer-readable storage medium of claim 13, wherein, in said automatically applying each of the one or more service metric validation rule sets to validate the service usage metrics of the respective ones of the one or more data sets, the program instructions cause the one or more computing devices to implement:
for the particular service metric validation rule set:
  obtaining a first portion of one data table from the one or more data sets;
  obtaining a second portion of another data table from the one or more data sets, wherein the second portion is an expected equivalent of the first portion; and
  calculating a difference between the first portion and the second portion; and
  in response to determining that the difference between the first portion and the second portion exceed a difference tolerance threshold, triggering the reporting event.

17. The non-transitory, computer-readable storage medium of claim 13, wherein the program instructions cause the one or more computing devices to further implement caching a version of at least a portion of a data set of the one or more data sets associated with a prior point in time.

18. The non-transitory, computer-readable storage medium of claim 17, wherein in said automatically applying each of the one or more service metric validation rule sets to validate the service usage metrics of the respective ones of the one or more data sets, the program instructions cause the one or more computing devices to implement:
  for the particular rule set:
    accessing the cached version of the portion of the data set associated with the prior point in time;
    obtaining a current version of the portion of the data set;
    calculating a difference between the cached version and the current version; and
    in response to determining that the difference exceeds a difference tolerance threshold, triggering the reporting event.

19. The non-transitory, computer-readable storage medium of claim 13,
  wherein the program instructions cause the one or more computing devices to further implement prior to performing the responsive action, determining that the reporting event is related to one or more previously determined reporting events; and
  wherein, in said performing the responsive action, the program instructions cause the one or more computing devices to implement including a notification of the reporting event with a notification for the one or more previously determined reporting events that is subsequently sent.

20. The non-transitory, computer-readable storage medium of claim 13, wherein, in said performing the responsive action, the program instructions cause the one or more computing devices to implement:
  sending a message indicating the reporting event; or
  creating a ticket in a troubleshooting ticket system for the reporting event.

\* \* \* \* \*